(12) United States Patent
Brashear et al.

(10) Patent No.: US 8,608,486 B1
(45) Date of Patent: Dec. 17, 2013

(54) DESKTOP SHIELD SYSTEM

(76) Inventors: Marla Brashear, Gibsonia, PA (US);
Paul Lyons, Hermitage, PA (US)

( * ) Notice: Subject to any disclaimer, the term of this patent is extended or adjusted under 35 U.S.C. 154(b) by 87 days.

(21) Appl. No.: 13/308,785

(22) Filed: Dec. 1, 2011

(51) Int. Cl.
*B43L 1/00* (2006.01)

(52) U.S. Cl.
USPC .......................................................... 434/408

(58) Field of Classification Search
USPC ......... 434/81, 85, 87, 88, 162, 163, 370, 408, 434/416, 428, 430; 40/358
See application file for complete search history.

(56) References Cited

U.S. PATENT DOCUMENTS

| | | | |
|---|---|---|---|
| 3,633,286 A * | 1/1972 | Maurer | 434/87 |
| 4,171,584 A * | 10/1979 | Kaiser | 40/490 |
| 5,110,295 A * | 5/1992 | Concra | 434/88 |
| 5,655,323 A * | 8/1997 | Lassoff | 40/611.1 |
| 5,741,561 A | 4/1998 | Lenkin | |
| 5,971,761 A | 10/1999 | Tillman, Sr. | |
| 5,988,636 A * | 11/1999 | Kilmer | 273/108.1 |
| 6,241,528 B1 * | 6/2001 | Myers | 434/408 |
| 6,419,495 B1 | 7/2002 | Lehmkuhl | |
| 7,255,566 B2 * | 8/2007 | Galbraith Coates | 434/408 |
| 7,264,476 B1 | 9/2007 | Klodt | |
| 7,354,273 B2 * | 4/2008 | Donelan | 434/408 |
| D569,142 S | 5/2008 | Burak | |
| 7,424,784 B1 * | 9/2008 | Leahy | 40/107 |
| 7,575,435 B2 | 8/2009 | Aho | |
| 7,924,657 B2 * | 4/2011 | Liebowitz | 368/327 |
| 7,963,772 B1 * | 6/2011 | Blazvick | 434/408 |
| 2006/0147892 A1 | 7/2006 | Moore | |
| 2007/0094904 A1 * | 5/2007 | Frank et al. | 40/594 |
| 2008/0104868 A1 * | 5/2008 | Drie | 40/110 |
| 2010/0203485 A1 | 8/2010 | Hansen | |

\* cited by examiner

*Primary Examiner* — Kurt Fernstrom

(57) ABSTRACT

A desktop shield system having a panel with a top surface and a bottom surface, the panel is clear or transparent, wherein a user can write on the top surface of the panel with a non-permanent marker, and a plurality of magnets on the bottom surface of the panel, wherein a template can be placed in between the bottom surface of the panel and a desktop.

7 Claims, 4 Drawing Sheets

DESKTOP SHIELD SYSTEM

FIELD OF THE INVENTION

The present invention is directed to a system for covering desktops (and over worksheet and templates), more particularly to a clear or transparent system for covering desktops, more particularly to a device that can be temporarily written on or marked on.

BACKGROUND OF THE INVENTION

A vast amount of paper is used every day in schools. The present invention features a novel desktop shield system for placing on desktops, e.g., over templates or worksheets (e.g., reference charts, nametags, alphabets, etc.). A user can mark or write on the system, and the system can then be erased. This allows the templates or worksheets to be used over and over again, reducing the amount of paper wasted.

The system of the present invention is durable. In some embodiments, the system is removed from the desktop for display purposes or collaborative discussion purposes. The present invention is not limited to use in classrooms.

SUMMARY

The present invention features a desktop shield system. In some embodiments, the system comprises a desktop, wherein a plurality of mating magnets are disposed atop the desktop; and a panel having a top surface and a bottom surface, the panel is clear or transparent, a plurality of magnets are disposed on the bottom surface of the panel, the magnets are aligned with the mating magnets on the desktop. A template can be placed in between the bottom surface of the panel and the desktop.

In some embodiments, the system comprises a panel having a top surface and a bottom surface, the panel is clear or transparent, wherein a user can write on the top surface of the panel with a non-permanent marker; and a plurality of magnets disposed on the bottom surface of the panel, wherein a template can be placed in between the bottom surface of the panel and a desktop.

In some embodiments, the panel is flat. In some embodiments, the panel is constructed from a material comprising a clear plastic or clear acrylic. In some embodiments, the magnets are disposed in a first corner, a second corner, a third corner, and a fourth corner of the panel. In some embodiments, the magnets are attached to the bottom surface of the panel via an adhesive.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
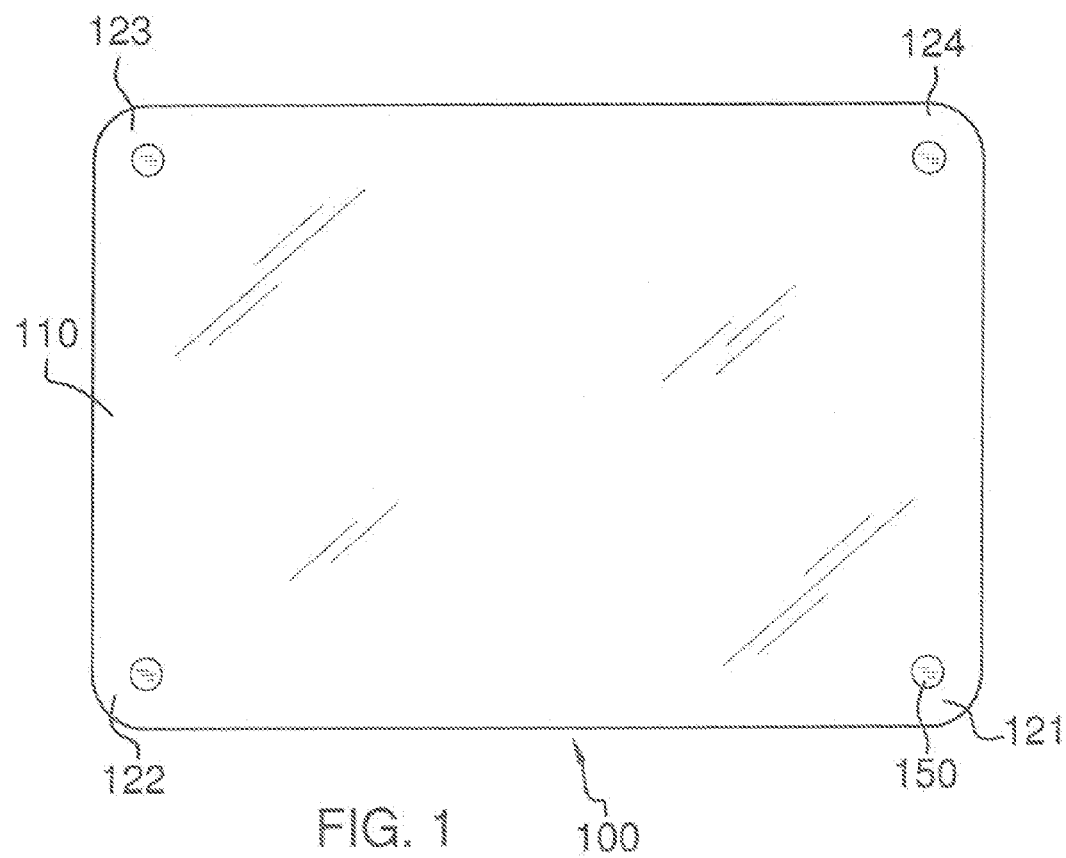
FIG. 1 is a top view of the system of the present invention.
Figure 2:
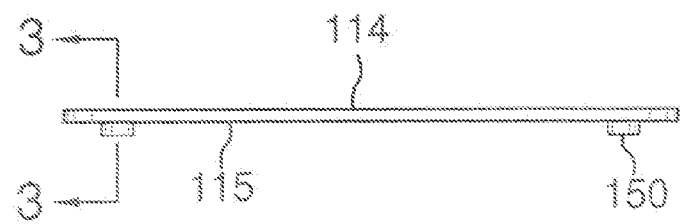
FIG. 2 is a side view of the system of the present invention.
Figure 3:
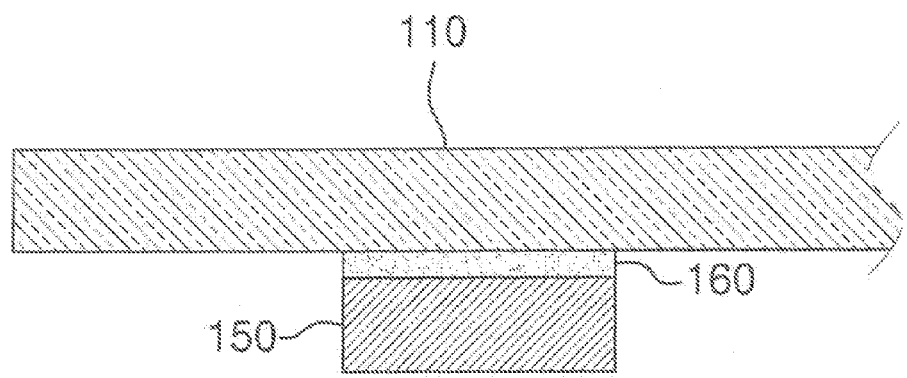
FIG. 3 is a cross sectional view of the system of FIG. 2.

Referring now to FIG. 1-5, the present invention features a novel desktop shield system 100 for placing atop desktops. In some embodiments, the system 100 is placed over templates or worksheets (e.g., reference charts, nametags, alphabets, etc.), e.g., the templates or worksheets are sandwiched between the system 100 and the desktop.

The system 100 of the present invention may be constructed in a variety of sizes, shapes, styles, and designs. For example, the system 100 may be shaped and sized to accommodate any desktop.

The system 100 allows users to write directly on the desktop since the system 100 acts like a dry erase board. Magnets of the system 100 allow for removal (from the desktop) and attachment to a metallic surface for display and/or discussion.

The system 100 of the present invention comprises a generally flat panel 110 having a top surface 114 and a bottom surface 115. The panel 110 is clear or transparent. The panel 110 may be constructed from a variety of materials, for example a material comprising a plastic (e.g., acrylic).

Disposed on the bottom surface 115 of the panel 110 is a plurality of magnets 150. In some embodiments, the magnets 150 are disposed in a first corner 121, a second corner 122, a third corner 123, and a fourth corner 124 of the panel 110. In some embodiments, the magnets 150 are attached to the bottom surface 115 of the panel 110 via an adhesive 160.

Figure 4:
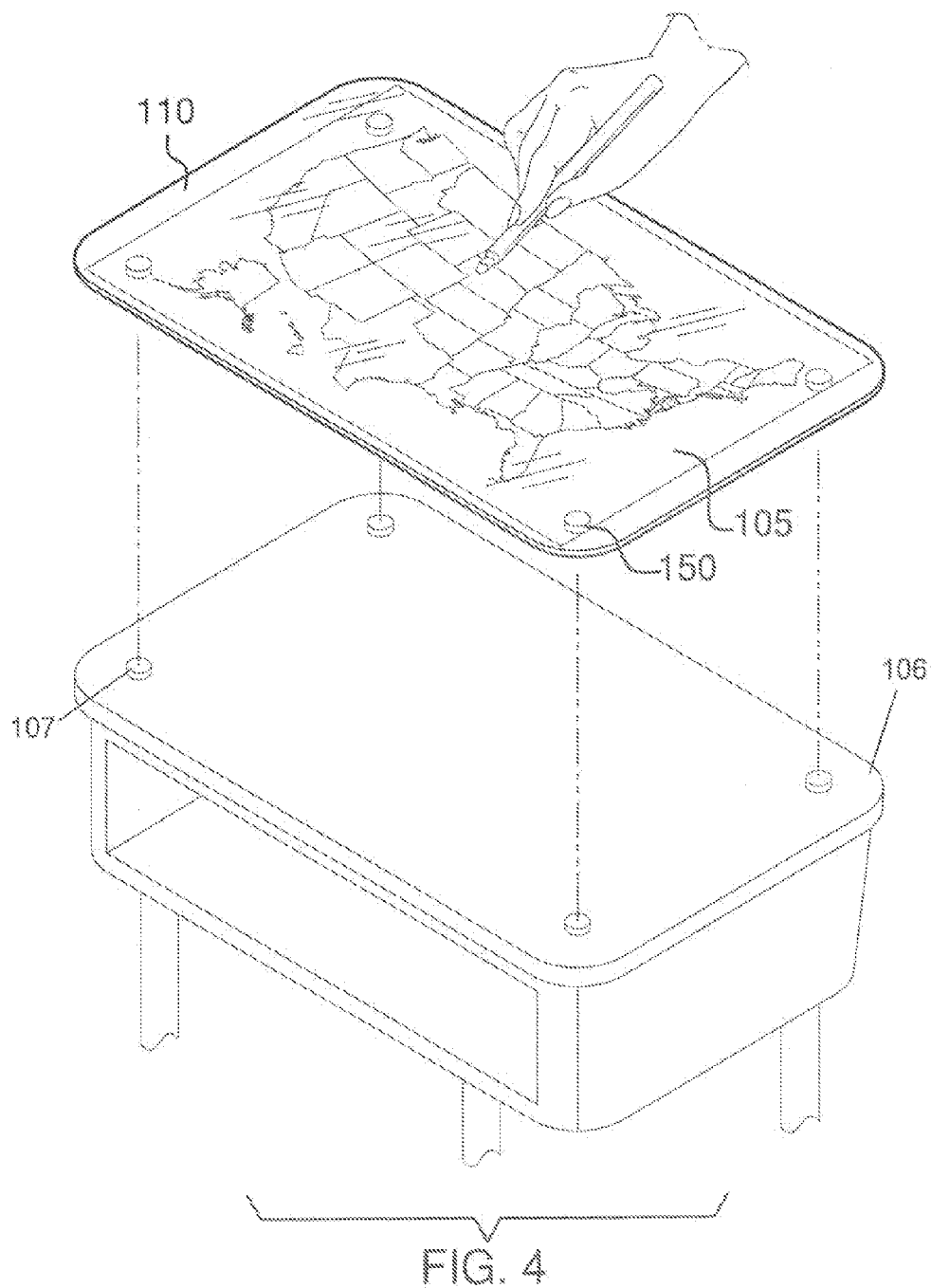
FIG. 4 is an in-use view of the system of the present invention on a desktop.
Figure 5:
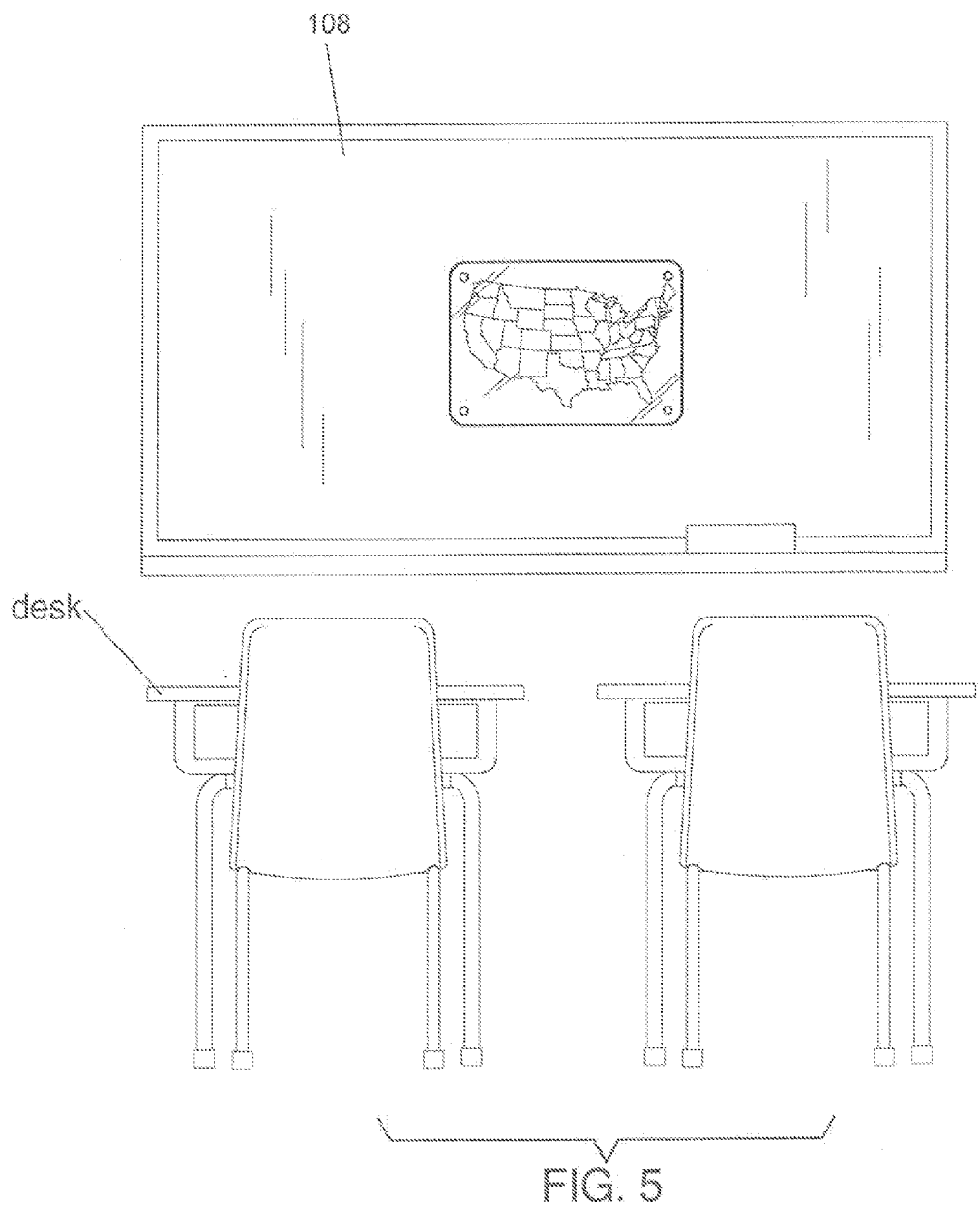
FIG. 5 is an in-use view of the system once transported to another magnetic surface in a room (e.g., a class whiteboard).

As shown in FIG. 4, a template 105 can be placed underneath the system 100 (e.g., in between the bottom surface 115 of the panel 110 and the desktop 106). A user can write on the top surface 114 of the panel 110, for example with a non-permanent marker such as a dry erase marker. The desktop 106 may comprise mating magnets (e.g., on the top surface of the desktop 106) that engage the magnets 150 on the bottom surface 115 of the panel 110. The system 100 is easily attached and removed via the magnets 150 for portability. As shown in FIG. 5, the system 100 can be moved and displayed on a surface including but not limited to a whiteboard 108, a refrigerator, or other magnetic surface. The magnets 150 on the panel 110 allow the system 100 to be attached as shown.

Without wishing to limit the present invention to any theory or mechanism, it is believed that the system 100 of the present invention is advantageous because the system features a top surface that can be written on; the system 100 of the present invention provides interactive templates that allow for endless interactive lessons; the system 100 can be moved and shared with large groups; and the system 100 can be cleared with dry erase markers/erasers.

The disclosures of the following U.S. Patents are incorporated in their entirety by reference herein: U.S. Pat. No. 5,741,561; U.S. Pat. No. 5,971,761; U.S. Pat. No. 6,419,495; U.S. Pat. No. 7,264,476; U.S. Design Pat. No. D569,142; U.S. Pat. No. 7,575,435; U.S. Patent Application No. 2006/0147892; U.S. Patent Application No. 2010/0203485.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A desktop shield system (100) comprising:
   (a) a desktop (106), wherein a plurality of mating magnets (107) are disposed atop the desktop (106); and
   (b) a panel (110) having a top surface (114) and a bottom surface (115), the panel (110) is clear or transparent, a plurality of magnets (150) are disposed on the bottom surface (115) of the panel (110), the magnets (150) are aligned with the mating magnets (107) on the desktop (106);

wherein a template (105) can be placed in between the bottom surface (115) of the panel (110) and the desktop (106), wherein the panel (110) is rigid, wherein the panel (110) is flat, wherein the panel (110) is constructed from a material comprising a clear plastic or clear acrylic.

2. The system (100) of claim 1, wherein the magnets (150) are disposed in a first corner (121), a second corner (122), a third corner (123), and a fourth corner (124) of the panel (110).

3. The system (100) of claim 1, wherein the magnets (150) are attached to the bottom surface (115) of the panel (110) via an adhesive (160).

4. A desktop shield system (100) comprising a panel (110) having a top surface (114) and a bottom surface (115), the panel (110) is clear or transparent, wherein a user can write on the top surface (114) of the panel with a non-permanent marker; and a plurality of magnets (150) disposed on the bottom surface (115) of the panel (110), wherein a template (150) can be placed in between the bottom surface (115) of the panel (110) and a desktop, wherein the panel (110) is rigid, wherein the panel (110) is flat, wherein the panel (110) is constructed from a material comprising a clear plastic or clear acrylic.

5. The system (100) of claim 4, wherein the magnets (150) are disposed in a first corner (121), a second corner (122), a third corner (123), and a fourth corner (124) of the panel (110).

6. The system (100) of claim 4, wherein the magnets (150) are attached to the bottom surface (115) of the panel (110) via an adhesive (160).

7. A desktop shield system (100) consisting of:
   (a) a desktop (106), wherein a plurality of mating magnets (107) are disposed atop the desktop (106); and
   (b) a panel (110) consisting of a top surface (114) and a bottom surface (115), the panel (110) is clear or transparent, a plurality of magnets (150) are disposed on the bottom surface (115) of the panel (110), the magnets (150) are aligned with the mating magnets (107) on the desktop (106);

wherein a template (105) can be placed in between the bottom surface (115) of the panel (110) and the desktop (106), wherein the panel (110) is rigid, wherein the panel (110) is flat, wherein the panel (110) is constructed from a material comprising a clear plastic or clear acrylic.

* * * * *